United States Patent [19]
Presbrey

[11] 4,184,270
[45] Jan. 22, 1980

[54] VISUAL AID TO BROADCASTED GOLF GAMES

[76] Inventor: Richard B. Presbrey, 236 Kuumele Pl., Kailua, Hi. 96734

[21] Appl. No.: 429,686

[22] Filed: Dec. 28, 1973

[51] Int. Cl.$^2$ .............................................. G09B 29/00
[52] U.S. Cl. .................................... 35/7 R; 35/29 A; 35/41
[58] Field of Search ................ 35/7 R, 7 A, 29 A, 41, 35/40, 12 N, 71; 273/87 R, 87 D, 134 CG, 134, 131 C; 116/120; 283/34, 35

[56] References Cited
U.S. PATENT DOCUMENTS

| | | | |
|---|---|---|---|
| 3,634,951 | 1/1972 | Knoll | 35/41 |
| 3,685,168 | 8/1972 | Reitz | 35/7 A |
| 3,820,134 | 6/1974 | Wilton et al. | 35/12 N |

*Primary Examiner*—Edward M. Coven
*Attorney, Agent, or Firm*—James C. Wray

[57] ABSTRACT

A visual aid for broadcasted golf games consists of a three-dimensional relief map of holes on real golf courses. The map is imprinted with vertical and horizontal grid lines and coordinates. Grid locations of played ball positions are broadcasted so that the broadcast audience can chart play on the map. The map is provided with scaled, punch-out trees and other obstacles which, in conjunction with the contours of the map, convey to an observer spatial information about the layout and obstacles of particular golf holes.

8 Claims, 4 Drawing Figures

VISUAL AID TO BROADCASTED GOLF GAMES

BACKGROUND OF THE INVENTION

The present invention is a visual aid for broadcasted golf games. The broadcasted games are conducted on real, full scale golf courses. Known golf simulations are mere board games and are not designed as visual aids to real golf matches. A need exists for a cheaply fabricated visual aid to be used in conjunction with radio or television coverage of golf matches.

A collection of devices of the type known in the prior art is found in the Official U.S. Patent Office Classification of Patents, particularly in class 35, subclass 41; class 283, subclass 34; class 273, subclass 87; and class 116, subclass 120. Examples of such devices are found in U.S. Pat. Nos. 367,178; 532,577; 1,640,699; 1,736,523; 2,674,813; 3,068,009; 3,068,099; and 3,355,175.

There are many known inventions of processes for forming three-dimensional relief maps, e.g. U.S. Pat. No. 532,577. Conventional art discloses many grid locating systems for maps, e.g. U.S. Pat. No. 367,178.

U.S. Pat. No. 2,674,813 is a three-dimensional relief map with additional three-dimensional markers and objects. The map is not designed or scaled to convey useful spatial information concerning the exact heights and locations of terrain features.

U.S. Pat. No. 3,068,009 describes a golf game wherein three-dimensional hazards are attached to a two dimensional map to form replicas of actual golf links. The intent of the invention, however, is not to provide a simulation of an actual game of golf conducted elsewhere.

U.S. Pat. Nos. 3,355,175 and 1,640,699 describe methods for locating golf shots on golf simulations game boards. U.S. Pat. No. 1,640,699 employs a range finder rule. Neither method can be employed as a useful visual aid for charting the shots in an actual game of golf with real players.

U.S. Pat. No. 1,736,523 is a game board capable of recording the linear ball positions of several players between tee and pin. Although the invention is not limited to use as a game rather than a visual aid, the invention does not provide a true three-dimensional positioning of the ball and does not provide a method for remote simulation of a golf game played on a real golf course.

A need exists for a simple and economical means for conveying precise and complete spatial game data to golf broadcast audiences.

SUMMARY OF THE INVENTION

The present invention concerns a visual aid to broadcasted sporting events.

In one embodiment of the present invention, a grid system with coordiantes is employed to subdivide a playing area where a sporting event is conducted. Sporting event instrumentalities such as, balls, players, or goals are located on the playing area by designating the coordinates of the grid subdivisions in which they lie. The initial spotting of instrumentalities can be done by aerial or ground observers. The coordinates designating instrumentality locations are broadcast to an audience equipped with special maps of the playing area. The maps are imprinted with a grid system corresponding to the grid system used to subdivide the playing area. With the aid of the map, a broadcast audience can precisely locate the instrumentalities of the sporting event.

In a preferred embodiment, the invention is employed to provide a visual aid for golf matches. The broadcast audience is equipped with maps of portions of golf courses on which broadcasted play is to be conducted. The coordinates of the locations of played balls, golf tees and golf pins are broadcasted to the audience.

In another preferred embodiment, the broadcasting is done by television. In this configuration, coordinates, pictures and commentary can be broadcasted simultaneously. In one form the coordinates can be announced over the audio portion of the television signal. In another form, the coordinates can be superimposed on the video portion of the television signal. In either case, the transmitting of the locating coordinates does not interfere with normal television coverage of the sporting event.

In another preferred embodiment of the present invention, a rectangular grid system is employed to subdivide the area in which play is conducted. Each subdivision is identified by its rectangular coordinates. The identifying alphabetic or numeric coordinates are broadcasted to the audience.

In a preferred embodiment of the present invention, removable self-adhering markers are provided with the maps of playing areas. The markers can be removably attached at the current grid positions of the sporting events moving instrumentalities. In one embodiment, the markers are adhesive backed discs. In the case that the sporting event is golf, the markers are used to locate the position of each player's ball during the match. Since tee and pin positions are sometimes changed, markers are also provided to precisely locate these positions.

In one embodiment of the present invention, the visual aid maps of the playing areas are two-dimensional maps with contour lines reflecting the relative elevations of different portions of the playing area. Such two-dimensional maps are cheaply manufactured and could be given to the audience for promotional purposes.

In another embodiment of the present invention, three-dimensional relief maps are distributed to the sporting event broadcast audience. In one form the maps are molded from plastic sheets to form the three-dimensional contours. In the case of golf maps, a single map can include the surface contours and features of one or a number of different golf holes.

In one configuration, the three-dimensional map sheets are formed with punch-out replicas of three-dimensional obstacles on the playing field or golf course, such as, trees, goal markers, barricades, etc. The replicas are mechanically attached to the map by means of slots in the map and corresponding tab structures on the replicas.

The three-dimensional nature of the map makes it particularly useful as a visual aid to broadcasted golf matches, because such a map conveys exact spatial information concerning course layout and obstacles. The necessary ball trajectories for successful shots are easily visualized on such a map.

As a further aid to appreciation of the sporting event, in one form of the invention, a wind direction indicator is rotatably mounted on the map. Wind direction information can be broadcasted from the site of the sporting event and noted on the map by turning the indicator to an orientation corresponding to the wind direction at the site.

An object of the present invention is to provide a visual aid to braodcasted sporting events which can convey precise spatial information concerning the conduct of play.

Another object of the present invention is to provide a visual aid to televised golf by which played ball positions can be precisely located on a map of the golf course by a television audience.

Another object of the present invention is to provide a realistically proportioned, three-dimensional relief map for televised golf audiences, to facilitate the audience's appreciation of the layout and obstacles of the golf course.

Another object of the present invention, is to provide a three-dimensional visual aid map for sporting events with mechanically attached replicas of three-dimensional objects at the sporting event site.

These and other objects and features of the invention are apparent from the disclosure, which includes the specification with the foregoing and ongoing description and with the claims, and which includes the drawings.

DETAILED DESCRIPTION OF THE DRAWINGS

Figure 1:
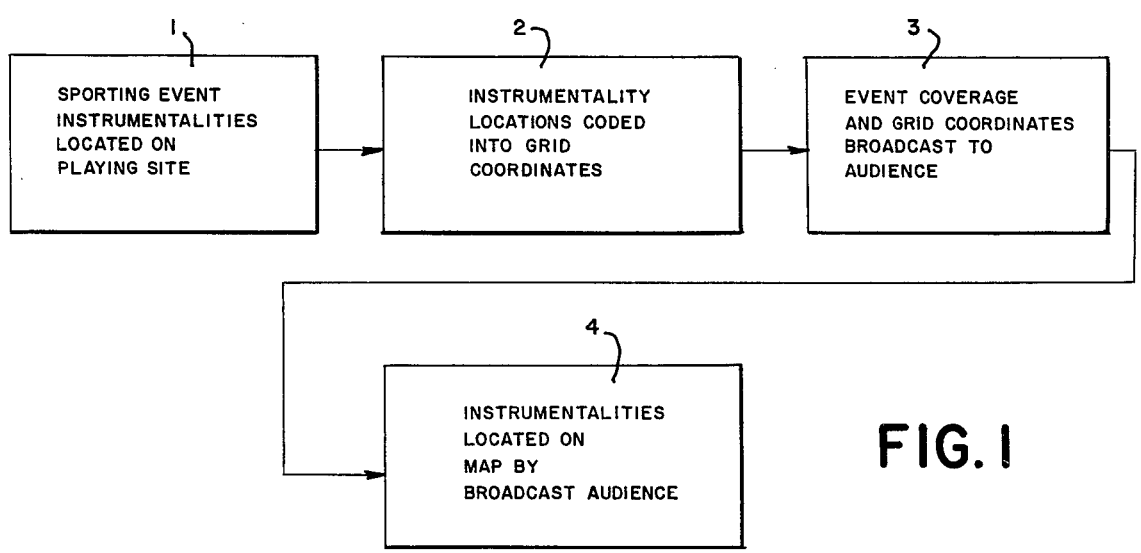
FIG. 1 is a block diagram of the successive steps of providing a visual aid for broadcasted sporting events.

FIG. 1 is a block diagram of the steps of a method providing a visual aid for broadcasted sporting events. The first block 1 represents the visual sighting or spotting of sporting event instrumentalities on the playing area. This could be accomplished by aerial observers or ground observers stationed at vantage points on the playing area. In the case that the sporting event is a golf match, the instrumentalities which would be spotted are played balls, pins, and tees.

The second block 2 represents the codification of instrumentality locations into grid coordinates. This step assumes a pre-established grid system with coordinates by which any location on the playing field can be identified in terms of its coordinates.

In one form of the invention, the grid system with coordinates is a rectangular coordinate system. By employing such a system, any location on the surface of the playing area can be identified by a pair of alphabetic or numeric coordinates.

Figure 2A:
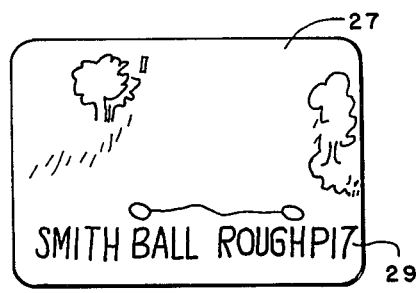
FIG. 2A is a schematic representation of a television picture.

The third block 3 represents the broadcasting of sporting event coverage and the instrumentality coordinates to an audience. In a preferred embodiment of the present invention, the broadcasting is done by television. The coordinates of particular instrumentalities of interest to the audience can be announced over the audio portion of the television signal or superimposed on the video portion of the television signal, as shown in FIG. 2A. In the case that the sporting event is golf, during coverage of play on particular holes of golf, coordinates of ball positions on that hole can be broadcasted.

The fourth block 4 represents the decoding of the instrumentality coordinates into precise locations on a map of the playing area.

A map of a preferred embodiment of the present invention is denoted generally by the numeral 6. The particular map shown in the drawings is a visual aid for broadcasted golf games. The map depicts the layout of two golf holes 8 and 10.

The map is imprinted with a rectilinear coordinate system composed of horizontal alphabetic coordinates 12 and vertical numeric coordinates 14. The coordinate system permits played balls, tees and pins to be located on the map from coordinate information broadcasted to the map-holder.

Figure 2:
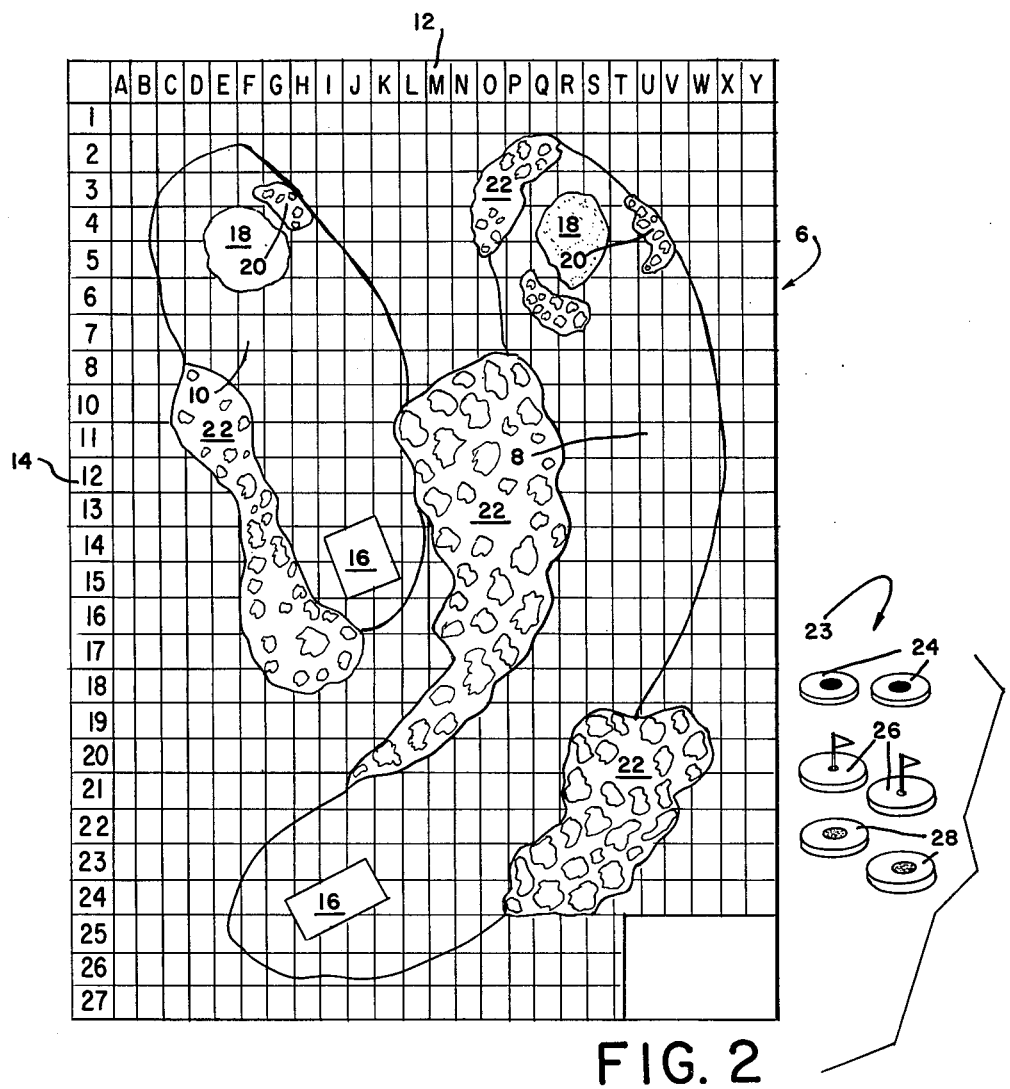
FIG. 2 is a top elevation of a map and markers employed in a preferred embodiment of the present invention.

Playing area terrain is reflected on the map. The map of the preferred embodiment shown in FIG. 2, shows the locations of teeing areas 16, greens 18, bunkers 20, and rough 22. In one configuration, elevation contour lines are imprinted on the map (not shown).

The map is equipped with removable, self-adhering markers, denoted generally by the numeral 23. In the case that the map is of a golf course, tee markers 24, pin markers 26, and ball markers 28 are provided with the map.

FIG. 2A is a schematic view of a television screen 27 in which coordinates of a ball position are superimposed 29 on the video portion of the television signal.

Figure 3:
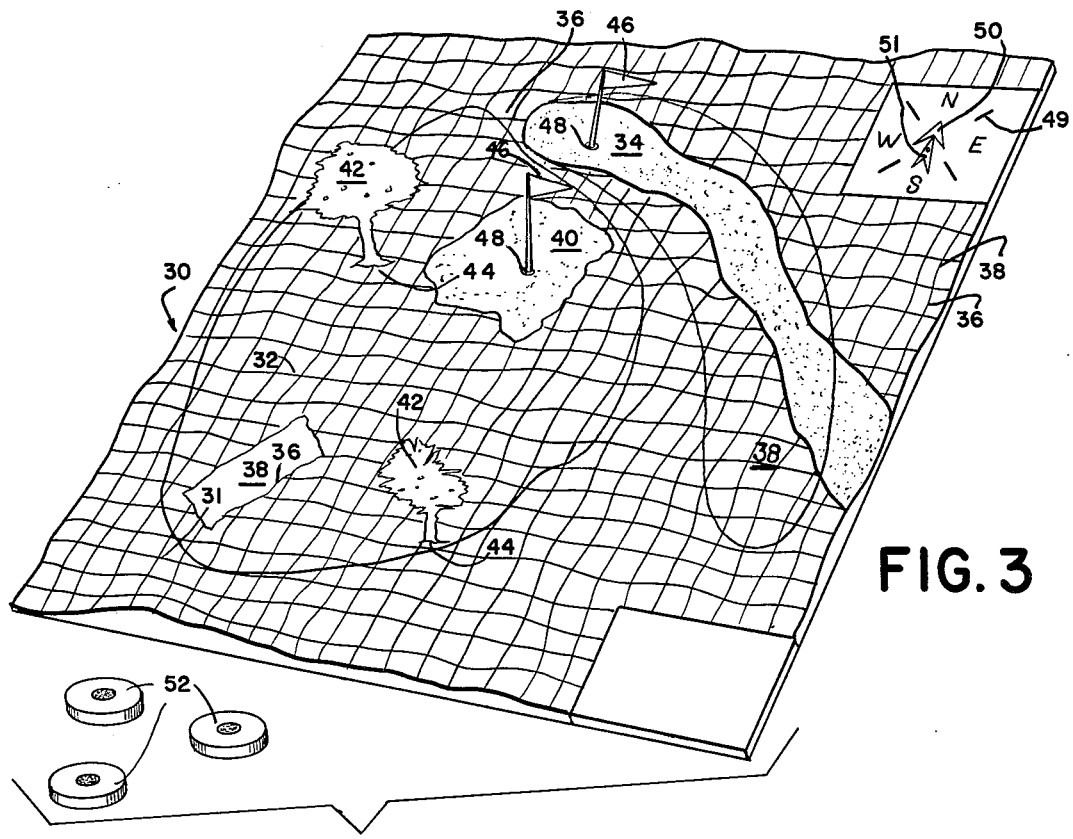
FIG. 3 is a perspective elevation of a three-dimensional relief map described as a preferred embodiment of the present invention.

FIG. 3 is a perspective view of the three-dimensional relief map 30 of a preferred embodiment of the present invention. A grid system with coordinates 31 is printed on the map. The map shown in FIG. 3 is a replica of two golf holes 32 and 34. The contours of the golf course are modeled by three-dimensional protrusions and indentations 36 in the map surface. In one form of the invention the map is molded from a sheet of plastic.

In addition to reflecting the terrain elevations, the map displays some of the features of the surface of the golf course. Teeing areas 38 and greens 40 are marked on the map. Three-dimensional components of the playing area such as pins 46 and trees 42 are represented by two-dimensional replicas punched from the map sheet. The replicas are mechanically attached to the map by inserting tab structures on the replicas into appropriate slots in the map. On the map shown in FIG. 3, trees 42 are fitted in slots 44 and pins 46 are fitted into slots 48.

In a preferred embodiment of the present invention, the map is equipped with a wind indicator 49. The indicator arm 50 is rotatably mounted to the map by means of a pin structure 51, so that the indicator arm is free to be set in a position corresponding to the wind direction at the golf course.

Removable, self-adhering ball markers 52 are provided with the map to note played ball positions.

While the invention has been described with reference to specific embodiments, it will be obvious that modifications and variations may be constructed without departing from the spirit and scope of the invention. The scope of the invention is described in the following claims.

I claim:

1. The method of providing a visual aid for broadcasted sporting events comprising
   subdividing a golf course area where a sporting event is conducted by means of a grid system with coordinates, designating subdivisions in the area by their coordinates, broadcasting coordinates corresponding to subdivisions in which played golf balls, golf tees, and golf pins are located, identifying the instrumentalities which are located in each subdivision, and locating positions of the instrumentalities on a map of the area where the sporting event is conducted by matching broadcasted coordinates with coordinates of a grid system on the map, which map grid system corresponds to the grid system which subdivides the area where the sporting event is conducted;

whereby, conduct of play in a sporting event is charted on a map by a broadcast audience.

2. The method of providing a visual aid for broadcasted sporting events of claim 1 wherein locating positions of the instrumentalities on a map comprises locating played ball positions, tee positions, and pin positions on a three-dimensional relief map of the golf course with an imprinted map grid system corresponding to the grid system which subdivides the golf course.

3. The method of providing a visual aid for broadcasted sporting events of claim 1 wherein the broadcasting of the sporting event and coordinates is done on television, and wherein the locating of the positions of the instrumentalities on the map is done by a television audience.

4. The method of providing a visual aid for broadcasted sporting events of claim 1 wherein the broadcasting of the coordinates is done in a video portion of a television signal so that images of the coordinates are superimposed on broadcasted pictures of the sporting event.

5. The method of providing a visual aid for broadcasted sporting events of claim 1 further comprising marking locations of the instrumentalities of the sporting event on the map.

6. The method of providing a visual aid for broadcasted sporting events of claim 5 wherein the marking of the locations of the instrumentalities on the map comprises placing removable, self-adhering markers onto the map.

7. The method of providing a visual aid for broadcasted sporting events of claim 1 wherein the subdividing of the area where the sporting event is conducted is done by means of a rectangular coordinate system.

8. The method of providing a visual aid for broadcasted sporting events of claim 7 wherein the broadcasting of coordinates comprises the broadcasting of rectangular coordinates of appropriate subdivisions of the area where the sporting event is conducted.

* * * * *